United States Patent [19]

Hanks

[11] 3,889,784
[45] June 17, 1975

[54] INTERNAL CALIPER BRAKE

[75] Inventor: James V. Hanks, Minneapolis, Minn.

[73] Assignee: Horton Manufacturing Co., Inc., Minneapolis, Minn.

[22] Filed: Feb. 28, 1974

[21] Appl. No.: 446,647

[52] U.S. Cl. ............. 188/71.4; 188/71.6; 188/72.3; 188/364 A; 188/366; 192/70; 192/85 AB; 192/113 A
[51] Int. Cl. ........................................ F16d 55/04
[58] Field of Search ........ 188/71.4, 71.6, 72.3, 366, 188/216, 264 A, 264 AA, 72.5; 192/70, 113 A, 85 AB, 85 CA

[56] References Cited
UNITED STATES PATENTS

| 2,082,277 | 6/1937 | Dierfeld .................... 188/71.4 X |
| 2,329,097 | 9/1943 | Ash ............................. 188/71.4 X |
| 2,552,571 | 5/1951 | Mercier ...................... 188/264 AA |
| 3,468,402 | 9/1969 | Edwards .................... 192/85 AB X |
| 3,762,517 | 10/1973 | Hanks ....................... 192/85 AB |

FOREIGN PATENTS OR APPLICATIONS

| 294,814 | 8/1928 | United Kingdom ............. 188/366 |
| 450,126 | 7/1936 | United Kingdom ............. 188/366 |

*Primary Examiner*—George E. A. Halvosa
*Attorney, Agent, or Firm*—Wicks & Nemer

[57] ABSTRACT

An internal caliper brake includes a rotor including an annular support for securement to a shaft to be braked, the annular support mounting an annular U-shaped housing having an annular U-shaped cavity having spaced opposed friction surfaces on the opposed walls of the cavity. The side walls of the housing and the outer annular base wall thereof each have a multiplicity of openings and each have fins formed thereon. A stator portion includes an annular base member mounting a first annular piston within the cavity, the first piston carrying an annular flange overlying the mounting to form an annular cylinder within the annular cavity. A second annular piston is mounted in the cylinder with springs for normally urging the pistons together with friction rings carried by each of the pistons for engagement with the friction surfaces of the U-shaped cavity. Also, bearings rotatably mount the rotor on the stator together with a bracket maintain the stator stationary, and springs are mounted on the stator for a spring return of the brake.

3 Claims, 5 Drawing Figures

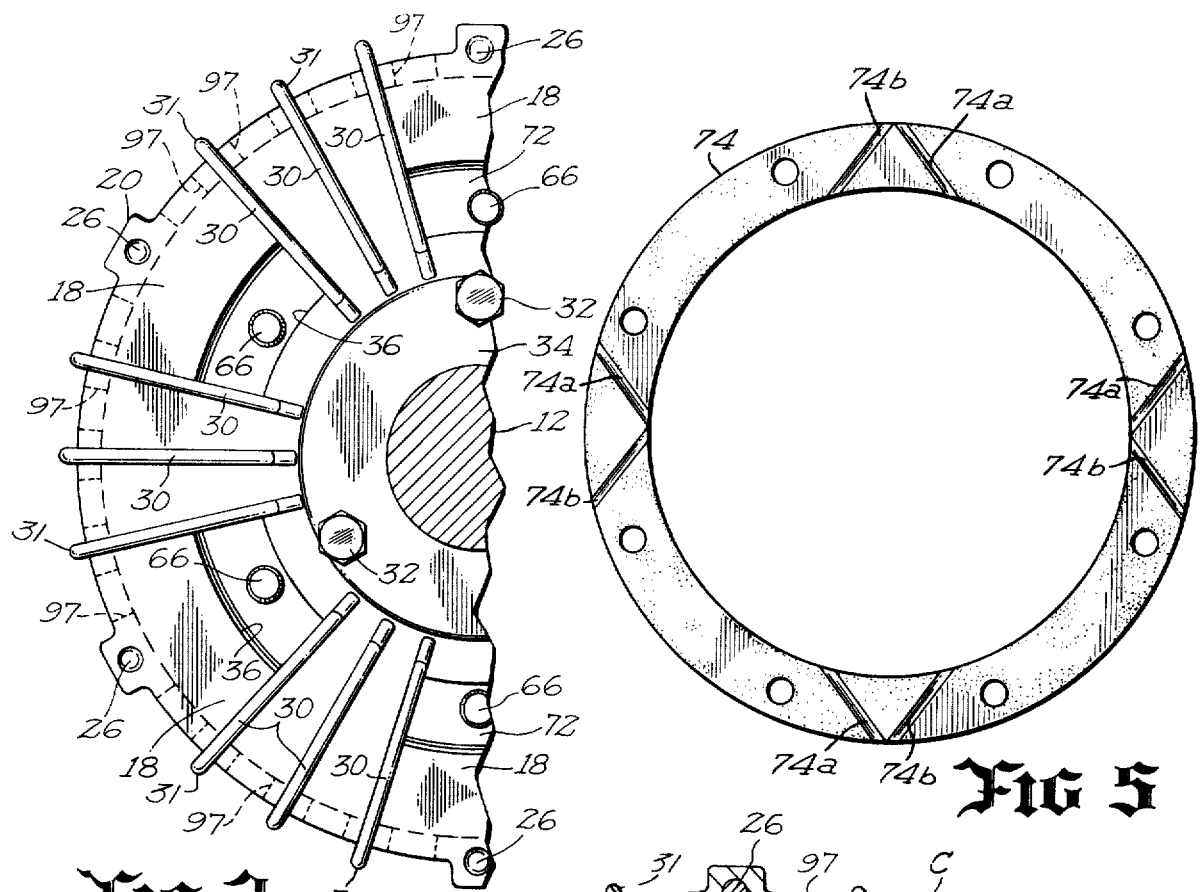
Fig 3
Fig 5
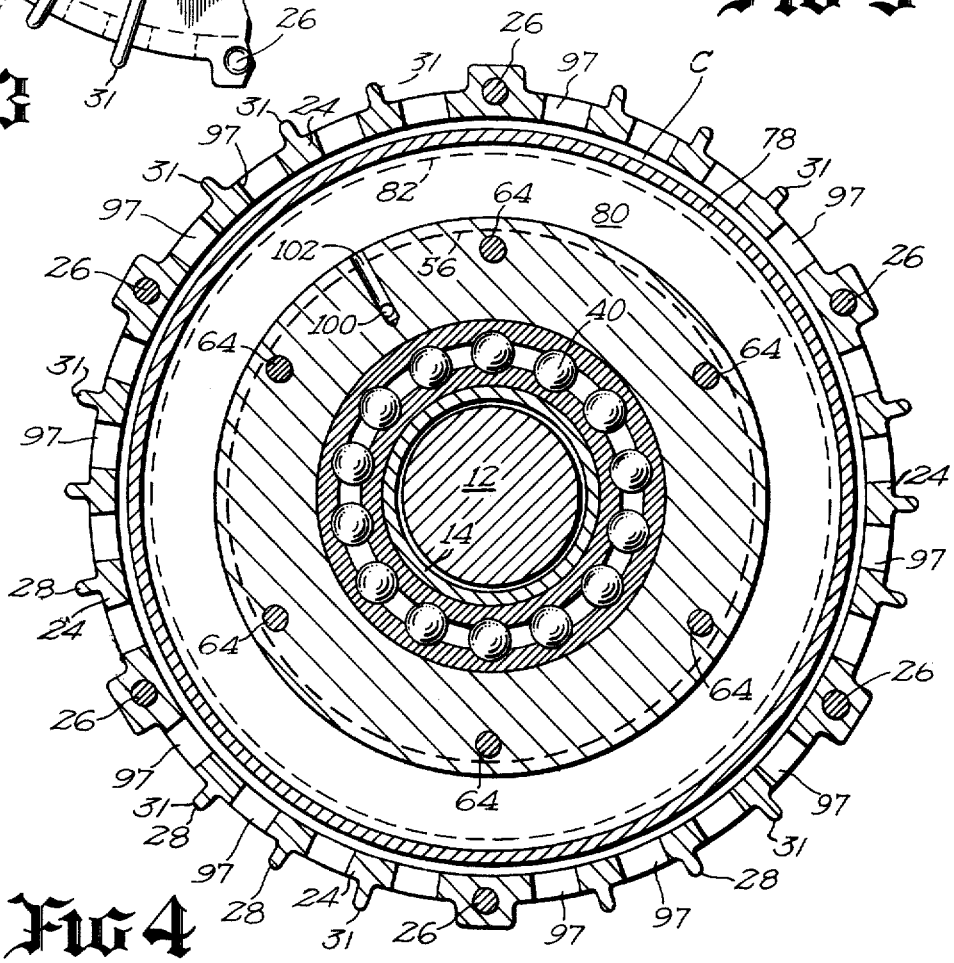
Fig 4

3,889,784

INTERNAL CALIPER BRAKE

SUMMARY

The invention relates broadly to brakes and more particularly to an internal caliper brake having an annular U-shaped housing having annular opposed side walls and an annular base wall which form an annular U-shaped cavity in which annular pistons having friction rings thereon engage the opposed side walls of the housing. Each of the side walls and the annular base has fins formed thereon and openings therein whereby an airflow is through the openings of the side walls, past the friction means and out the openings of the annular base wall whereby cooling is provided hitherto unattainable in brakes of a related type. When the brake is in engagement an air flow past the engaged friction rings is through grooves formed in the rings and when the brake is disengaged air flow is past the friction rings.

Further the construction of the brake is such that it allows assembly with a spring return and with the double piston cylinder construction there are only three O-rings for sealing engagement of both pistons instead of the conventional four O-rings.

In the drawings forming part of this application:

FIG. 3 is a rear view of the remaining 180° of the housing of FIG. 2.

FIG. 4 is a sectional view on the line 4—4 of FIG. 1.

FIG. 5 is a plan view of a friction ring on the line 5—5 of FIG. 1.

Figures 1, 2:
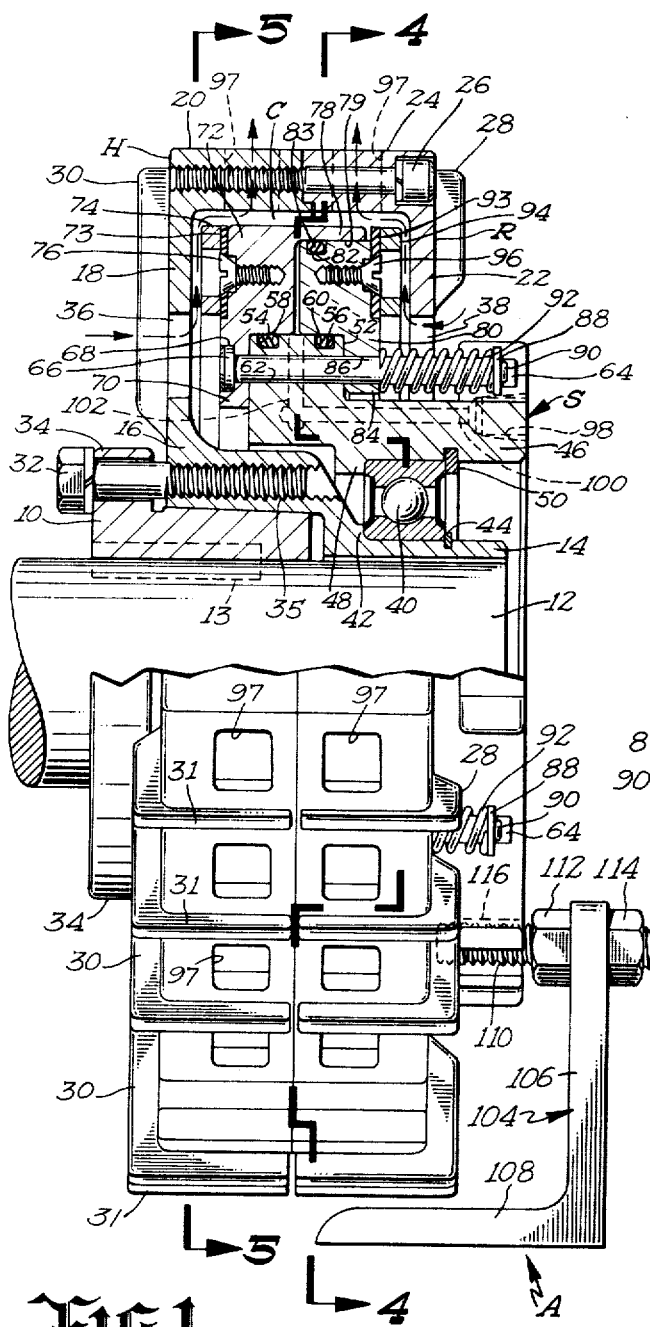
FIG. 1 is a partial axial sectional view of a brake embodying the invention in a disengaged condition.
FIG. 2 is a rear view of 180° of the housing incorporating the brake.

Referring to the drawings in detail the brake A includes the rotor R including the bushing 10 which is keyed to the shaft 12 by means of the key 13 to be braked. Further provided as part of the rotor is the hub 14 on which is formed the annular flange 16 which terminates in a first radially extending disc portion 18 the inner surface of which provides a friction surface. Formed on the outer periphery of the disc portion 18 is the right angular annular flange 20 which overlies the annular support 16.

The numeral 22 designates a second disc portion formed as a ring at a right angle to and as part of the annular support 24 secured to the annular flange 20 by the bolts 26. The inner surface of the disc portions 22 provides a friction surface 22a in juxtaposition to surface 18a. Formed on the disc portion 22 are the spaced cooling fins 28 and formed on the disc portion 18 are the cooling fins 30. The first disc portion 18 and the second disc portion 22 are spaced and in axial alignment and together with flange 20 and support 24 form an annular housing H with an internal annular U-shaped cavity C. The outer surface of the flange 20 and support 24 are formed with the cooling fins 31, and the flange 20 and support 24 together form an annular wall of the housing H.

The annular support 16 is secured to the bushing 10 by means of the bolts 32 extended through the annular flange 34 formed on the bushing 10 and threadedly engaged in the threaded holes 35 in the support 16. The bushing 10, the hub 14 and the annular flange 16 forms an annular support. The first disc portion 18 is formed with the spaced openings 36 and the second disc portion 22 is formed with the spaced openings 38.

Mounted on the hub 14 is the bearing 40 the inner race of which is positioned against the annular shoulder 42 and maintained by the split ring 44. Further provided is the stator S which includes the annular base member 46 formed with the annular shoulder 48 against which the outer race of the bearing 40 is positioned. The outer race of bearing 40 is secured in position by means of the split ring 50.

The annular base member 46 is formed with the radially extended annular flange 52 formed with the grooves 54 and 56 in which the O-rings 58 and 60, respectively, are positioned. The annular flange 52 is formed with a multiplicity of holes 62 in each of which is positioned a clevis pin 64. The head 66 of each pin is positioned in a recess 68 of the annular flange 70 on the inner edge of the first annular piston. The annular flange 70 is formed with a multiplicity of holes 71 in alignment with holes 62 and 86. The annular piston 72 is slidable axially on a portion of the flange 52 with sealing engagement between the piston and the flange by means of the O-ring 58.

Secured to the piston 72 is the shoe ring 73 by means of the bolts 76 and on which is bonded the friction ring 74, the ring in juxtaposition to the disc portion 18 and for engagement therewith.

The friction ring 74 has formed on the flat exposed surface thereof the grooves 74a and 74b which extend from one edge to the other and allow passage or flow of air between the friction ring and the disc portion 18 even though the friction ring is in contact with the disc portion 18. Thus air can flow in through openings 16, through the grooves 74a and 74b, into the annular cavity C and out through openings 97.

Extending from the outer portion of the piston 72 and as part thereof is the annular flange 78 which overlies a portion of flange 52 thereby forming an annular cylinder 79 in which the second annular piston 80 slides axially. The outer edge of the piston 80 is formed with the groove 82 in which is positioned the O-ring 84 which makes a seal between the piston 80 and the flange 78. The annular piston 80 has formed on a portion of the inner annular edge thereof the annular piston flange 84 in which is formed a multiplicity of holes 86 in each of which the pin 64 is positioned. The pin 64 extends outwardly of the flange 84 and has securely mounted on the outer end thereof the washer 88 by means of the cotter pin 90. Positioned between the washer 88 and the flange 84 is the coil spring 92 which normally urges the pistons 72 and 80 together. With the above construction the pistons 72 and 80 are carried by and both slidable and separable in a floating manner on the pins 64 against the action of the spring 92 and upon the flange 52.

The piston 80 has secured to the outer face thereof the shoe ring 93 on which is bonded the friction ring 94, the ring secured to the piston by means of the bolts 96. The ring 94 is identical to ring 74 and is in juxtaposition to the disc portion 22 and for engagement therewith.

The outer wearing surface of each of the friction rings 74 and 94 is formed with the aforementioned grooves commonly known as "wagon tracks." These grooves allow flow-through ventilation from openings 36 and 38, through the grooves, into annular cavity C, and out the openings 97. The flow through air is expelled from the cavity C through holes 97 formed in flange 20 and support 24 as indicated by the broken line arrows in FIG. 1. The velocity and volume of the flow through air is enhanced by the fins 30, 28 and 31 which is possible due to to the construction disclosed which provides fins on three sides of the annular cavity C. The numeral 98 designates a fluid inlet port formed in the annular base member 46 from which leads the fluid passageway 100. Fluid pressure is supplied to the inlet 98 by conventional means. The passageway 100 terminates in the right angular disposed fluid passageway 102 which leads to the cylinder 79 at a point midway between the pistons 72 and 80.

The stator S is held stationary by means of the bracket 104 formed of the upright leg 106 and the right angular base leg 108. The base leg 108 is secured to a conventional anchor member not shown, and the upright leg 106 has the threaded pin 110 secured thereto by means of the nuts 112 and 114. The inner end of the pin 110 engages in a recess 116 formed in the annular base member 46 thereby holding the stator S against rotation.

OPERATION

Upon the introduction of fluid pressure into the inlet 98, pressure in the cylinder 79 forces the pistons 72 and 80 axially apart whereby the friction ring 74 contacts the disc portion 18, and the friction ring 94 contacts the second disc portion 22 all against the action of the springs 92. As a result the rotor R and the shaft 12 connected thereto are braked. Upon the release of fluid pressure the springs 92 urge the pistons 72 and 80 together and when together the construction stack-up of parts provides a clearance between the friction rings 74 and 94 and the disc portions 18 and 22, respectively. The brake is cooled by a flow of air entering the openings 36 and 38 and passing into the annular chamber C from which it exits out the openings 97. The velocity and volumne of the flow through air is enhanced by the fins 30, 31 and 28 which literally surround the housing H with the internal annular cavity C. Such construction gives cooling hitherto unattained in similar brakes. Further the construction of the brake is such that assembly allows the mounting of springs 92 with a spring return. Also the construction of the double pistons and cylinder requires only three O-rings whereas in similar brakes four O-rings are required.

I claim:
1. An internal caliper brake comprising:
   a. a rotor portion including an annular support for securement to a shaft to be braked,
   b. said annular support mounting an annular U-shaped housing having a radially extended first disc portion, an annular base wall and a second disc portion spaced from said first disc portion which forms
   c. a U-shaped annular cavity having spaced opposed friction surfaces in the form of said first and second disc portions,
   d. a stator portion including an annular base member having
   e. means for mounting
   f. a first annular piston within said cavity, said mounting means for the piston including an annular flange on said annular base member upon which said piston is slidable,
   g. said first piston carrying an annular flange overlying said mounting means to form
   h. an annular cylinder within said annular cavity,
   i. a second annular piston mounted in said cylinder,
   j. means for normally urging said pistons together which includes an annular flange formed on the inner annular edge of said second piston,
   k. said flange of said second piston having a multiplicity of holes therethrough,
   l. said first piston includes an annular flange formed on the inner annular edge,
   m. said inner flange of said first piston having a multiplicity of holes,
   n. said annular flange of said annular base member having a multiplicity of holes,
   o. a pin mounted in the holes of said flanges of said pistons and the holes of said annular flange of said annular base member,
   p. shoulder means formed on the outer end of each of said pins,
   q. a coil spring mounted on each of said pins between said shoulder means and said flange of said second piston to normally thereby urge the pistons together,
   r. friction means carried by each of said pistons for engagement with the opposed friction surfaces of said U-shaped cavity,
   s. means rotatably mounting said rotor on said stator including a bearing mounted between said annular base member of said stator and said annular support of said rotor,
   t. means for maintaining said stator stationary,
   u. means for mounting said annular support of said rotor on a shaft to be braked,
   v. means carried by said annular housing for dissipating heat from the brake through the annular cavity and out said annular housing including a multiplicity of holes formed in said first disc portion of said annular housing,
   w. a multiplicity of holes formed in said second disc portion of said annular housing,
   x. a multiplicity of holes formed in said annular base wall of said annular housing,
   y. fins mounted on said first disc portion, said second disc portion and said annular base wall,
   z. said friction means of said pistons having grooves therein whereby upon a braking of the device air passes inwardly of said holes in said first and second disc portions, through said grooves of said friction means and out said holes of said annular base wall of said annular housing.

2. The device of claim 1 in which said annular support includes a
   a. bushing which carries a
   b. hub which mounts
   c. an annular flange.

3. The device of claim 1 in which said means mounting said first annular piston includes
   a. a first annular recess in which is positioned
   b. a first O-ring for sealing engagement with said first piston, and
   c. a second annular recess formed in said mounting means in which is positioned
   d. a second O-ring for sealing engagement with said second piston and
   e. a third annular recess formed in said second piston in which is positioned
   f. a third O-ring for sealing engagement with said annular flange of said first piston.

* * * * *